United States Patent [19]

Tanaka et al.

[11] Patent Number: 5,247,054
[45] Date of Patent: Sep. 21, 1993

[54] ORGANIC POLYMER FERROMAGNETIC MATERIAL AND PROCESS FOR PREPARING POLYMER

[75] Inventors: Hitoshi Tanaka; Tsuneyuki Sato, both of Tokushima; Todatoshi Ota, deceased, late of Tokushima, by Fumiko Ota, legal representative; Michio Sasaoka, Tokushima, all of Japan

[73] Assignee: Otsuka Kagaku Kabushiki Kaisha, Osaka, Japan

[21] Appl. No.: 561,643

[22] Filed: Aug. 1, 1990

[30] Foreign Application Priority Data

Aug. 3, 1989 [JP] Japan ................................ 1-202099
Dec. 7, 1989 [JP] Japan ................................ 1-320119

[51] Int. Cl.$^5$ ............................................ C08G 61/00
[52] U.S. Cl. ............................. 528/220; 528/229; 528/396; 528/422; 528/373; 528/391
[58] Field of Search ............ 528/220, 229, 396, 422, 528/373, 391, 422; 522/173, 178, 180, 181

[56] References Cited

U.S. PATENT DOCUMENTS 4,954,607 9/1990 Otani et al. ......................... 528/396

FOREIGN PATENT DOCUMENTS 3241023 10/1988 Japan ................................ 528/396

*Primary Examiner*—John Kight, III
*Assistant Examiner*—R. Johnson
*Attorney, Agent, or Firm*—Armstrong, Westerman, Hattori, McLeland & Naughton

[57] ABSTRACT

An organic polymer ferromagnetic material characterized in that the material comprises a polymer obtained by subjecting to plasma polymerization or oxidation polymerization a methane derivative having two substituents and represented by the formula $$\begin{array}{c} A \\ | \\ CH_2 \\ | \\ B \end{array} \quad (1)$$

wherein A is an electron accepting group, and B is an electron donating group, or by copolymerizing the methane derivative with a diarylmethane derivative represented by the formula $$\begin{array}{c} R^1 \\ | \\ CH_2 \\ | \\ R^1 \end{array} \quad (2)$$

wherein $R^1$ is a substituted or unsubstituted phenyl group by plasma polymerization or oxidation polymerization.

6 Claims, 3 Drawing Sheets

ORGANIC POLYMER FERROMAGNETIC MATERIAL AND PROCESS FOR PREPARING POLYMER

The present invention relates to a novel organic polymer ferromagnetic material and to a process for preparing a polymer suitable as the material.

It is generally known that organic substances are magnetically diamagnetic materials, and almost all ferromagnetic materials are inorganic. In fact, an organic substance, especially an organic polymer material which is lightweight and moldable and which is ferromagnetic has been considered a dream of a material. Thus, useful organic ferromagnetic materials still remain to be developed.

An object of the present invention is to provide a useful organic polymer ferromagnetic material which is lightweight and moldable, and a process for preparing a polymer suitable as the material.

The above and other objects of the invention will become apparent from the following description.

The present invention provides an organic polymer ferromagnetic material characterized in that the material comprises a polymer obtained by subjecting to plasma polymerization or oxidation polymerization a methane derivative having two substituents and represented by the formula

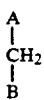  (1)

wherein A is an electron accepting group, and B is an electron donating group, or by copolymerizing the methane derivative with a diarylmethane derivative represented by the formula

  (2)

wherein $R^1$ is a substituted or unsubstituted phenyl group by plasma polymerization or oxidation polymerization, and also provides a process for preparing a polymer suitable as the material.

We have conducted intensive research and obtained a polymer from a methane derivative wherein a carbon atom is substituted with an electron accepting group and an electron donating group, by subjecting the derivative to plasma polymerization or oxidation polymerization as a monomer, or obtained a polymer by copolymerizing the monomer with a diarylmethane derivative by plasma polymerization or oxidation polymerization. We have found that the polymer thus obtained fulfills the object of the present invention.

The organic polymer ferromagnetic material of the present invention is lightweight, can be molded into a desired configuration and is useful for magnetic recording media, magnetic shielding materials, organic magnets, etc.

The organic polymer ferromagnetic material of the present invention may be a homopolymer or copolymer and is preferably a polymer in a high-spin state and having in the molecule a repeating unit represented by the formula

  (3)

wherein A and B are as defined above. In the case where A in the above formula is a cyano group, the polymer may have in the molecule a repeating unit which is represented by the formula

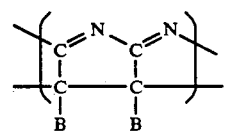  (4)

wherein B is as defined above and which is formed by the reaction of the cyano groups on adjacent carbon atoms in polymer molecules. The polymer may have a chain as crosslinked by the group —C≡N— or the like.

The organic polymer ferromagnetic material has a molecular weight which is suitably 300 to 500,000, preferably 500 to 100,000.

According to the invention, examples of electron accepting groups represented by A are cyano, nitro,

and —$SO_2R^2$, wherein $R^2$ is methyl, ethyl, propyl, i-propyl, or such a group in which at least one hydrogen atom is substituted with a halogen atom. Examples of halogen atoms are F, Cl, Br, I and the like.

Examples of electron donating groups represented by B are lower alkoxy groups such as methoxy, ethoxy, propoxy and i-propoxy; lower alkylthio groups such as methylthio, ethylthio, propylthio and i-propylthio; amino groups having or not having a lower alkyl substituent, such as amino, methylamino, dimethylamino, ethylamino and diethylamino; etc.

Examples of substituents on the phenyl group represented by $R^1$ are lower alkoxy groups such as methoxy and ethoxy, halogen atoms such as F, Cl, Br and I, lower alkyl groups such as methyl and ethyl, etc.

The organic polymer ferromagnetic material of the present invention can be prepared, for example, by subjecting to plasma polymerization or oxidation polymerization a methane derivative having two substituents and represented by the formula

  (1)

wherein A and B are as defined above, or by copolymerizing the methane derivative with a diarylmethan derivative represented by the formula

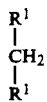

$$\begin{array}{c} R^1 \\ | \\ CH_2 \\ | \\ R^1 \end{array} \quad (2)$$

wherein $R^1$ is as defined above by plasma polymerization or oxidation polymerization.

The method of plasma polymerization is not limited specifically but can be practiced using a usual plasma polymerization apparatus. For example, the monomer alone, or a mixture of the monomer and the diarylmethane derivative to be copolymerized therewith is polymerized as it is, or along with a carrier gas such as He, Ne, Ar, Kr, Xe, $N_2$, $O_2$ or the like.

The power source output for plasma polymerization is not limited specifically but is usually 10 to 100W.

The internal pressure of the plasma polymerization apparatus is usually a reduced pressure, i.e., 0.1 to 10 millibars, preferably 0.1 to 1 millibar. The flow rate of the carrier gas, which is not limited specifically, is usually 10 to 100ml/min. The plasma polymerization time is usually 10 minutes to 20 hours although variable with the polymerization condition, the kind of monomer, etc.

The method of oxidation polymerization is not limited specifically. For example, a polymerization initiator is added to the monomer, or to a mixture of the monomer and the diarylmethane derivative to be copolymerized therewith, and the resulting mixture is irradiated with light or heated.

The polymerization initiator to be used is not limited specifically. Examples of useful initiators are peroxide initiators such as benzoyl peroxide, lauroyl peroxide, di-tert-butyl peroxide, 2,5-dimethyl-2,5-di(tert-butyl-peroxy)hexane, dicumyl peroxide, tert-butyl hydroperoxide, cumene hydroperoxide, diisopropyl peroxydicarbonate and dicyclohexyl peroxydicarbonate; azo initiators such as azobisisobutyronitrile, azobisdimethylvaleronitrile and azobiscyclohexanecarbonitrile; quinone initiators such as chloranil, tetrafluoro-1,4-benzoquinone and 2,3-dichloro-5,6-dicyano-1,4benzoquinone; metal oxidizer initiators such as potassium ferricyanide and lead (II) oxide; etc.

The light source to be used for applying light for polymerization can be any one insofar as the light source produces light of wavelength for optically decomposing the polymerization initiator used. Usually, a high-voltage mercury lamp is used. When heating is resorted to, the heating temperature must not be lower than the decomposition temperature of the polymerization initiator used. It is usually desirable to heat the mixture at a temperature of 50° to 250° C.

Although the amount of polymerization initiator to be used varies with the kind of initiator, monomer to be polymerized or monomer to be copolymerized therewith, it is usually 0.5 to 5 moles per mole of the monomer. In the case of copolymerization, it is 0.5 to 4 times the combined amount of monomers to be copolymerized in terms of mole.

The polymerization reaction time varies with the kind of initiator to be used, monomer to be polymerized or monomer to be copolymerized therewith, the reaction temperature or the type of light source to be used for the application of light. It is usually 1 to 100 hours.

After the completion of the reaction, the desired polymer can be treated by the usual method for isolation.

The present invention will be described in greater detail with reference to the following examples, to which the invention is not limited.

EXAMPLE 1

Figure 1:
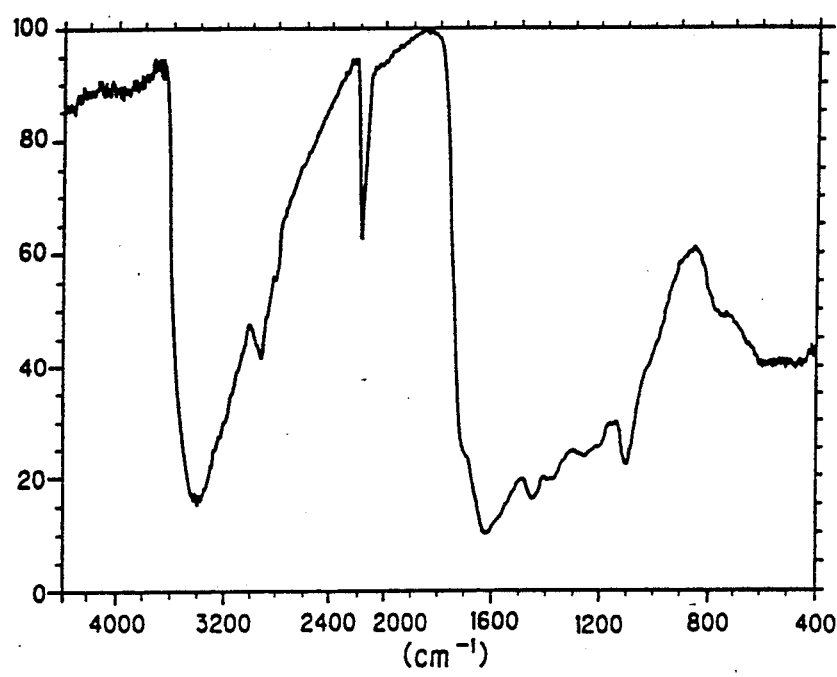
FIGS. 1 and 3 show IR spectra of the polymers obtained in Examples 1 and 2.
Figure 2:
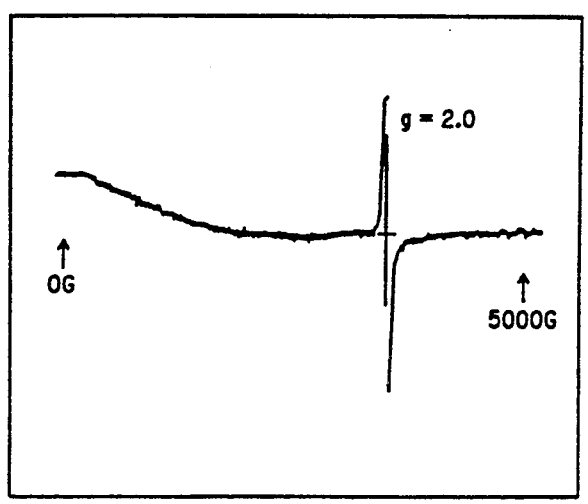
FIGS. 2 and 4 show ESR spectra of the polymers obtained in Examples 1 and 3.

A 0.3 ml quantity of methoxyacetonitrile and 0.37 ml of di-tert-butyl peroxide were placed into a sealing ampule, which was then deaerated by the freeze-thaw method and thereafter sealed off. The mixture was subsequently reacted in a constant-temperature bath at 130° C. for 60 hours. After the reaction, the mixture in the ampule was placed into acetone, and the resulting precipitate was filtered off with a glass filter to separate an acetone-soluble portion from an acetone-insoluble portion. The acetone-insoluble precipitate was dried to find that the yield was 15% based on the methoxyacetonitrile used. An IR spectrum of the product revealed absorption due to —C=N— at 3400 $cm^{-1}$ and 1625 $cm^{-1}$, and absorption due to —CN at 2240 $cm^{-1}$ as seen in FIG. 1. Further an ESR spectrum of the product revealed absorption indicating a high-spin state exhibiting a ferromagnetic property around OG, in addition to absorption due to paramagnetism of $g=2.0$ as shown in FIG. 2. Further when a permanent magnet was brought close to the product as placed on the surface of water and made free from the influence of static electricity, the product was attracted to the magnet. The magnetic susceptibility of the product was found to be $X=5.0\times10^{-2}$ emu/g when measured.

EXAMPLE 2

Figure 3:
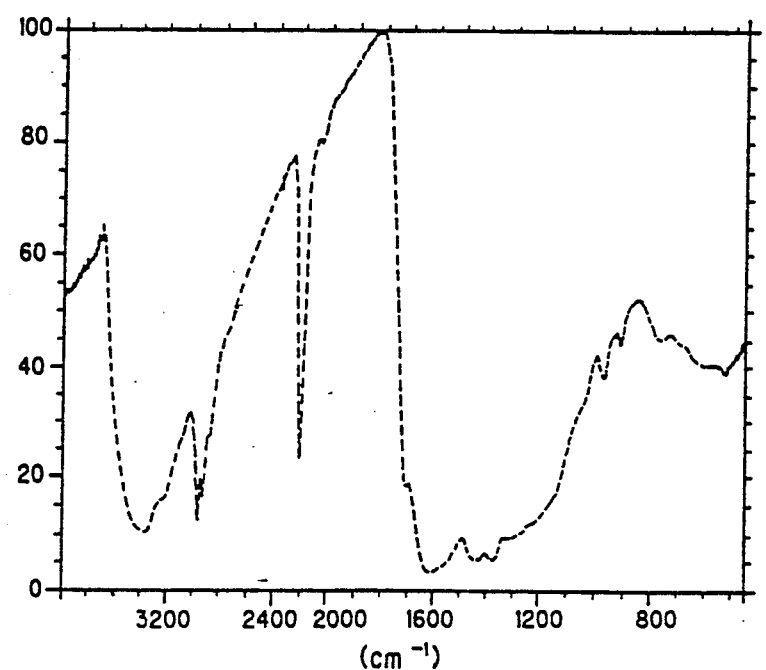

A 0.17 ml quantity of methylthioacetonitrile and 0.75 ml of 2,5-dimethyl-2,5-di(tert-butylperoxy)hexane were placed into a sealing ampule, which was then deaerated by the freeze-thaw method and thereafter sealed off. Subsequently, the mixture was reacted in a constant-temperature bath at 130° C. for 60 hours. After the reaction, the mixture in the ampule was placed into methanol, and the resulting precipitate was filtered off with a glass filter to separate a methanol-soluble portion from a methanol-insoluble portion. The methanol-insoluble precipitate was dried to find that the yield was 14% based on the methylthioacetonitrile used. GPC revealed that the product was 500 to 20,000 in molecular weight distribution. When a permanent magnet was brought close to the product as floated on the surface of water and made free of influence of static electricity, the product was attracted to the magnet. An IR spectrum of the product revealed absorption due to —C=N— at 3357 $cm^{-1}$ and 1613 $cm^{-1}$, and absorption due to —CN at 2205 $cm^{-1}$ as shown in FIG. 3. The magnetic susceptibility of the product was found to be $X=4.0\times10^{-2}$ emu/g when measured.

EXAMPLE 3

Figure 4:
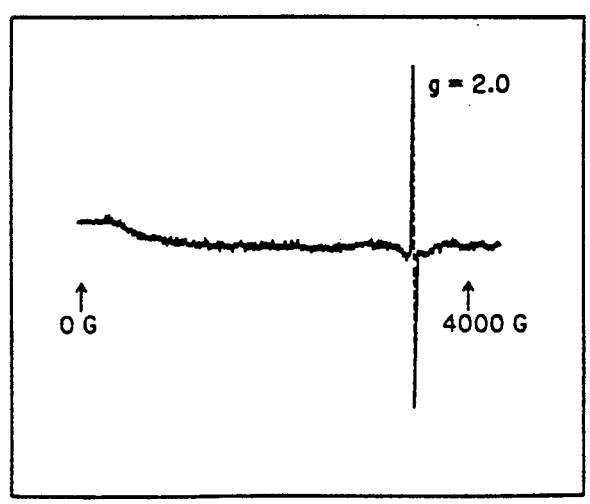

A 0.3 ml quantity of methoxyacetonitrile, 0.68 ml of diphenylmethane and 0.74 ml of di-tert-butyl peroxide were placed into a sealing ampule, which was then deaerated by the freeze-thaw method and thereafter sealed off. Subsequently, the mixture was reacted in a constant-temperature bath at 130° C. for 40 hours. After the reaction, the mixture in the ampule was placed into hexane, and the resulting precipitate was filtered off with a glass filter to separate a hexane-soluble portion from a hexane-insoluble portion. The hexane-insoluble precipitate obtained was dried and subjected to elementary analysis, which revealed 76.61% of C and 8.20% of N. When calculated from the C content, the content of methoxyacetonitrile units in the copolymer was found to be 63.1%. Incidentally, the N content calculated from this result was 8.27%, which was approximately in agreement with the measurement. An ESR spectrum of the product revealed absorption due to the presence of high-spin state exhibiting a ferromagnetic property in the vicinity of OG, in addition to absorption due to paramagnetism of $g=2.0$ as shown in FIG. 4. When a permanent magnet was brought close to the product as floated on the surface of water and made free from the influence of static electricity, the product was attracted to the magnet. The magnetic susceptibility of the product was found to be $X=4.7\times10^{-2}$ emu/g when measured.

EXAMPLE 4

Figure 5:
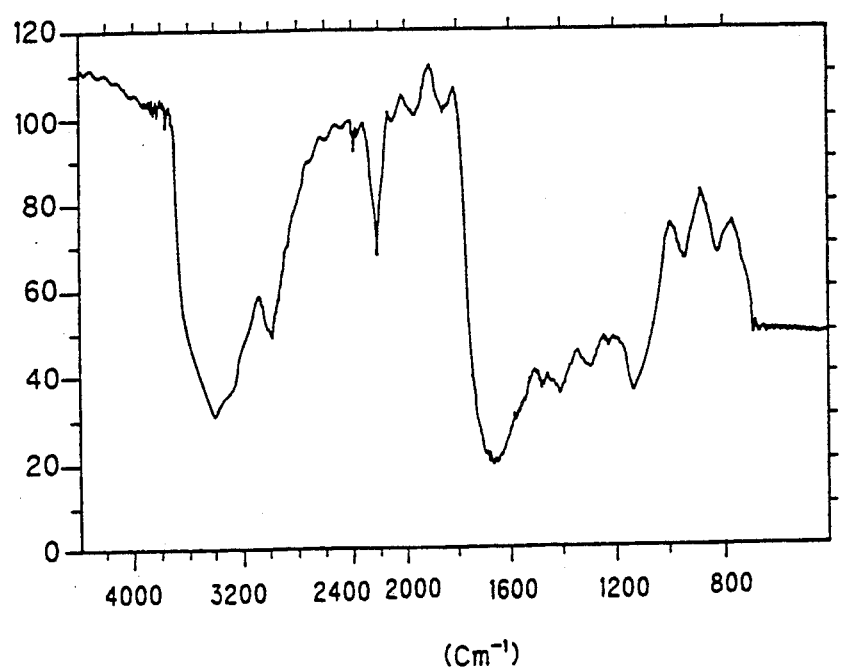
FIGS. 5 shows an IR spectrum of the polymer obtained in Example 4.

Methoxyacetonitrile was fed along with argon gas at a flow rate of 40 ml/min to a plasma polymerization apparatus controlled to 0.6 millibar, and was subjected to plasma polymerization at a power source output of 20 W for 40 minutes, whereby particulate polymer was formed on the wall surface of the reactor. When a permanent magnet was brought close to the product as floated on the surface of water and made free from the influence of static electricity, the product was attracted to the magnet. FIG. 5 shows an IR spectrum of the product obtained.

We claim:

1. An organic polymer ferromagnetic material characterized in that the material comprises a polymer obtained by subjecting to plasma polymerization or oxidation polymerization a methane derivative having two substituents and represented by the formula

 (1)

wherein A is an electron accepting group selected from the group consisting of a cyano group, nitro group,

or —SO$_2$R$^2$, wherein R$^2$ is methyl, ethyl, propyl, i-propyl, and a group in which at least one hydrogen atom is substituted with a halogen atom, and B is an electron donating group selected from the group consisting of a lower alkoxy group, lower alkylthio group and amino group having or not having a lower alkyl substituent, or by copolymerizing the methane derivative with a diarylmethane derivative represented by the formula

 (2)

wherein R$^1$ is a substituted or unsubstituted phenyl group by plasma polymerization or oxidation polymerization.

2. An organic polymer ferromagnetic material as defined in claim 1 wherein the electron accepting group represented by A is a cyano group, and the electron donating group represented by B is a lower alkoxy group or lower alkylthio group.

3. An organic polymer ferromagnetic material as defined in claim 2 wherein the electron accepting group represented by A is a cyano group, and the electron donating group represented by B is a methoxy group or methylthio group.

4. A process for preparing a polymer at least having a repeating unit represented by

wherein A is an electron accepting group selected from the group consisting of a cyano group, nitro group,

or —SO$_2$R$^2$, wherein R$^2$ is methyl, ethyl, propyl, i-propyl, and a group in which at least one hydrogen atom is substituted with a halogen atom, and B is an electron donating group selected from the group consisting of a lower alkoxy group, lower alkylthio group and amino group having or not having a lower alkyl substituent, characterized by subjecting to plasma polymerization or oxidation polymerization a methane derivative having two substituents and represented by the formula

 (1)

wherein A and B are as defined above, or by copolymerizing the methane derivative with a diarylmethane derivative represented by the formula

 (2)

wherein R$^1$ is a substituted or unsubstituted phenyl group by plasma polymerization or oxidation polymerization.

5. A process as defined in claim 4 wherein the electron accepting group represented by A is a cyano group, and the electron donating group represented by B is a lower alkoxy group or lower alkylthio group.

6. A process as defined in claim 5 wherein the electron accepting group represented by A is a cyano group, and the electron donating group represented by B is a methoxy group or methylthio group.

* * * * *